Nov. 1, 1955  L. D. DROUET  2,722,596
BIRD WARMING DEVICE
Filed Aug. 31, 1953

INVENTOR
LOUIS D. DROUET
ATTORNEY

United States Patent Office 2,722,596
Patented Nov. 1, 1955

2,722,596
BIRD WARMING DEVICE

Louis D. Drouet, Alameda, Calif., assignor of one-half to Stanley M. Richmond, Eugene, Oreg.

Application August 31, 1953, Serial No. 377,538

2 Claims. (Cl. 219—45)

This invention relates generally to warming devices and particularly to a bird warming device.

The main object of this invention is to provide a means for protecting perching birds against the action of cold when attendants might be away or asleep, or normal heating appliances are turned off.

The second object is to enable each bird to adjust his position on the perch to suit his own particular desires for heat.

The third object is to provide a thermostatically controlled warmer for each unit.

The fourth object is to so construct the heater unit that it will not cause excessive drying of the droppings and that the heater unit may be easily cleaned.

I accomplish these and other objects in the manner set forth in the following specification as illustrated in the accompanying drawing, in which Fig. 1 is a side elevation of a cage equipped with one of these bird warmers.

Like numbers of reference refer to the same or similar parts throughout the several views.

Figure 1:
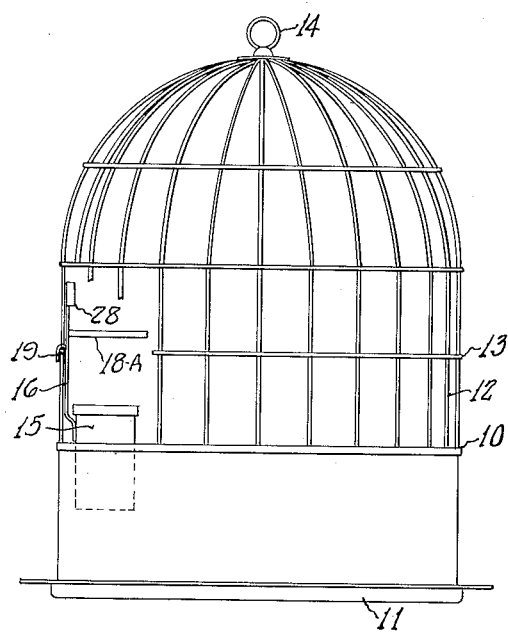

Referring in detail to the drawing there is shown a common form of bird cage 10 with its usual base 11 and cage bars 12 and 13. There is also indicated the usual ring 14 from which the cage can be suspended.

Figure 2:
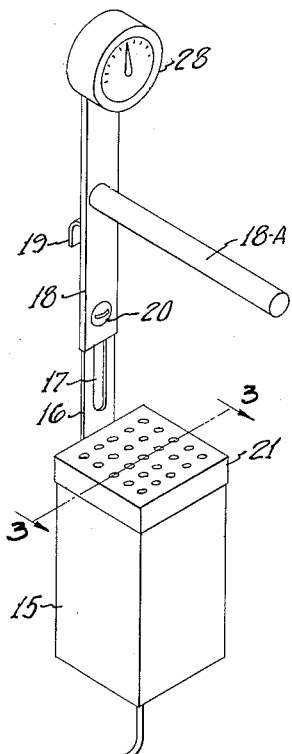
Fig. 2 is a diagrammatic view of the thermostat and lamp which serves as a heater.
Figure 3:
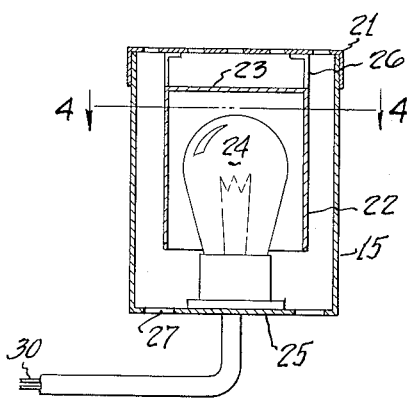
Fig. 3 is a perspective view of the protected heater unit.
Figure 4:
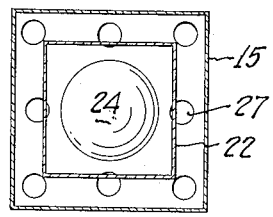
Fig. 4 is a section taken along the line 4—4 in Fig. 3.

The invention can best be seen in Figs. 2, 3 and 4, in which a rectangular upright box 15 is supported by a strap 16, which is provided with a slot 17. On the strap 16 is mounted a slide 18 on which is secured a hook 19 which engages a cage bar 13 and supports the box 15 at the desired elevation.

The slide 18 is secured to the strap 16 by a screw 20. A perch 18–A projects horizontally from the slide 18.

On the box 15 is a perforated friction cover 21, from the under side of which is supended the heater box 22 whose top 23 is spaced from the cover 21. The walls of the box 22 are spaced from the box 15 and permit heat to flow from the lamp 24 mounted on the bottom 25 upwardly through the cover 21. The box 22 is attached to the cover 21 by straps 26. Holes 27 in the bottom 25 allow air to enter the heater.

Figure 5:
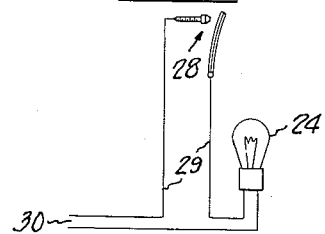
Fig. 5 is a wiring diagram showing the heating and control elements.

In Fig. 5 is shown a thermostat 28 in the circuit 29 of the lamp 24, which is joined to a power circuit 30.

In the operation of the device it is suspended by the hook 19 on the bar 13 at a height which will leave the perch 18–A the desired distance above the cover 21. The screw 20 being tightened, heat is now applied to the lamp 24 and the bird can find a place on the perch 18–A which suits his comfort, in most cases being near the end of the perch 18–A, keeping the cover 21 free from droppings. Any droppings which do fall upon the cover 21 may be brushed off when the cage is cleaned.

I claim:

1. A bird warming device having in combination an air warming box having a perforated cover on its top side, a perch adjustably mounted over said perforated cover, means for supporting said box and perch at a predetermined elevation with relation to a bird cage, a thermostat mounted near said perch, a heat generator in the circuit of said thermostat, an open bottom heater box spaced from the top and sides of said air warming box and from the perforations in the cover thereof, said perch having one end thereof extending beyond the endmost limits of said perforated cover.

2. A box for lamp units in bird warming devices comprised of an upright vertical box having a perforated friction cover having air inlets at the bottom thereof and having an incandescent lamp mounted on said bottom, a heat box spaced from said perforated cover and spaced from the bottom thereof, said heat box having the top side thereof closed and the bottom open and spaced from the bottom of said vertical box, and a perch over the top of said vertical box extending laterally beyond the end of said vertical box.

References Cited in the file of this patent

UNITED STATES PATENTS

| 1,561,317 | Eshelman | Nov. 10, 1925 |
| 1,796,761 | O'Brien | Mar. 17, 1931 |

FOREIGN PATENTS

| 368,331 | Great Britain | Mar. 1, 1932 |